United States Patent Office 3,340,201
Patented Sept. 5, 1967

3,340,201
COMPOSITION OF MATTER CONTAINING PLUTONIUM DIOXIDE AND PLUTONIUM PHOSPHATE
Henry P. Kirchner, State College, Pa., assignor to Cornell Aeronautical Laboratory, Inc., Buffalo, N.Y., a corporation of New York
No Drawing. Filed Mar. 11, 1965, Ser. No. 439,054
1 Claim. (Cl. 252—301.1)

This invention relates to a composition of matter containing plutonium.

In accordance with the present invention, a new composition of matter is provided which comprises a mixture in the solid state of plutonium dioxide ($PuO_2$) and plutonium phosphate ($PuP_2O_7$).

Compositions containing plutonium are useful for nuclear reactor fuel elements. Important advantages of such compositions are that they have a high melting point, low thermal expansion coefficient, open space within the lattice structure to store fission products, and high thermal conductivity within the plutonium phosphate crystals.

Plutonium dioxide has a relatively high coefficient of expansion and by itself is disadvantageous for use in nuclear processes inasmuch as the relatively high temperature environments inherent in many nuclear processes can result either in thermal stresses which might cause mechanical failure or design difficulties.

Plutonium phosphate has a relatively low coefficient of expansion and is therefore attractive for use in nuclear processes.

Yet all compositions comprising a mixture of plutonium dioxide and plutonium phosphate have an unusually low thermal expansion coefficient. An article made of such a composition when subjected to temperature variation will not develop thermal stresses which lead to fracture of the article, thereby rendering such a composition particularly useful for nuclear reactor fuel elements or for other nuclear reactor applications.

Moreover, thermal expansion matching can be achieved. Thus, if the composition is used as a nuclear reactor fuel element, the thermal expansion coefficient of one layer of fuel operating at a given temperature can be matched to another fuel layer operating at a different temperature, by adjusting the proportions of plutonium dioxide to plutonium phosphate in each fuel layer. Also, where the composition is used as a nuclear reactor fuel element clad with another material the proportions of the composition ingredients may be adjusted to provide a fuel element having a thermal expansion coefficient which matches that of the material of which the cladding is composed.

Inasmuch as the plutonium phosphate has a very open structure on an atomic scale, the composition of plutonium phosphate and plutonium dioxide will have an open structure useful for the storage and retention of fission products which will prevent distortion or rupture as in the case of materials not having an open structure.

In accordance with the present invention, the thermal expansion of composites constituted of sintered mixtures of plutonium dioxide and plutonium phosphate have advantage over either pure material. Moreover, the atomic structure of plutonium phosphate has a large amount of open space in the sense that the sum of the volumes of the individual ions is significantly less than the volume of the total structure. This open space can be used to store and retain fission products, a consideration which is often important in nuclear materials.

From the foregoing it will be seen that the present invention provides a new and useful composition of matter.

What is claimed is:

A new composition of matter consisting essentially of a mixture in the solid state of plutonium dioxide and plutonium phosphate.

References Cited

UNITED STATES PATENTS 3,126,349    3/1964    Kirchner _____ 252—301.1

CARL D. QUARFORTH, *Primary Examiner.*

BENJAMIN R. PADGETT, *Examiner.*

S. J. LECHERT, Jr., *Assistant Examiner.*